US011836088B2

(12) United States Patent
Allan (10) Patent No.: US 11,836,088 B2
(45) Date of Patent: Dec. 5, 2023

(54) GUIDED CACHE REPLACEMENT

(71) Applicant: Advanced Micro Devices, Inc., Santa Clara, CA (US)

(72) Inventor: Jeffrey Christopher Allan, Billerica, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/557,793

(22) Filed: Dec. 21, 2021

(65) Prior Publication Data

US 2023/0195641 A1    Jun. 22, 2023

(51) Int. Cl.
*G06F 12/08* (2016.01)
*G06F 12/0893* (2016.01)

(52) U.S. Cl.
CPC .. *G06F 12/0893* (2013.01); *G06F 2212/6042* (2013.01)

(58) Field of Classification Search
CPC . G06F 12/0893; G06F 12/08; G06F 2212/604
See application file for complete search history.

(56) References Cited

U.S. PATENT DOCUMENTS

| 11,604,733 | B1 | 3/2023 | Krueger |
| 2007/0043906 | A1 | 2/2007 | Hall et al. |
| 2010/0250856 | A1 | 9/2010 | Owen et al. |
| 2011/0066807 | A1 | 3/2011 | Hay et al. |
| 2014/0032845 | A1 | 1/2014 | Avudaiyappan et al. |
| 2014/0181412 | A1 | 6/2014 | Thottethodi et al. |
| 2014/0285505 | A1 | 9/2014 | Nakanishi |
| 2015/0169457 | A1* | 6/2015 | Jackson ............... G06F 12/121 711/135 |
| 2015/0178214 | A1 | 6/2015 | Alameldeen et al. |
| 2016/0071313 | A1* | 3/2016 | Laine .................... G06T 15/08 345/419 |
| 2016/0299849 | A1 | 10/2016 | Herdrich et al. |

(Continued)

FOREIGN PATENT DOCUMENTS

| KR | 20100038109 A | 4/2010 |
| KR | 20200035311 A | 4/2020 |

OTHER PUBLICATIONS

M. Shihabul Haque, J. Peddersen, A. Janapsatya and S. Parameswaran, "DEW: A fast level 1 cache simulation approach for embedded processors with FIFO replacement policy," 2010 Design, Automation & Test in Europe Conference & Exhibition (Date 2010), Dresden, Germany, 2010, pp. 496-501.*

(Continued)

*Primary Examiner* — Pierre Michel Bataille
(74) *Attorney, Agent, or Firm* — FIG. 1 Patents (57) ABSTRACT

Guided cache replacement is described. In accordance with the described techniques, a request to access a cache is received, and a cache replacement policy which controls loading data into the cache is accessed. The cache replacement policy includes a tree structure having nodes corresponding to cachelines of the cache and a traversal algorithm controlling traversal of the tree structure to select one of the cachelines. Traversal of the tree structure is guided using the traversal algorithm to select a cacheline to allocate to the request. The guided traversal modifies at least one decision of the traversal algorithm to avoid selection of a non-replaceable cacheline.

20 Claims, 6 Drawing Sheets

(56) References Cited

U.S. PATENT DOCUMENTS

| | | |
|---|---|---|
| 2017/0286220 A1 | 10/2017 | Gerhard et al. |
| 2017/0337132 A1 | 11/2017 | Eickemeyer et al. |
| 2019/0129863 A1* | 5/2019 | Jibbe ............... G06F 12/0871 |
| 2019/0340123 A1 | 11/2019 | Herdrich et al. |
| 2021/0318961 A1* | 10/2021 | Peterson ............ G06F 12/0804 |
| 2022/0318641 A1* | 10/2022 | Carreira-Perpiñán ............... G06N 20/20 |
| 2023/0126531 A1* | 4/2023 | Croxford ............ G06T 1/60 345/418 |
| 2023/0195625 A1 | 6/2023 | Allan |
| 2023/0195640 A1 | 6/2023 | Allan |

OTHER PUBLICATIONS

Lidan Shou, Z. Huang and K. .-L. Tan, "The hierarchical degree-of-visibility tree," in IEEE Transactions on Knowledge and Data Engineering, vol. 16, No. 11, pp. 1357-1369, Nov. 2004.*

Kluge, "Traversing Binary Tree Structures with Shift-Register Memories," in IEEE Transactions on Computers, vol. C-26, No. 11, pp. 1112-1122, Nov. 1977.*

W. Zhang, Z. Yan, Y. Lin, C. Zhao and L. Peng, "A High Throughput B+tree for SIMD Architectures," in IEEE Transactions on Parallel and Distributed Systems, vol. 31, No. 3, pp. 707-720, Mar. 1, 2020.*

U.S. Appl. No. 17/557,815 , "Non-Final Office Action", U.S. Appl. No. 17/557,815, dated Feb. 2, 2023, 16 pages.

U.S. Appl. No. 17/557,731, filed Jun. 23, 2023 , "Non-Final Office Action", U.S. Appl. No. 17/557,731, filed Jun. 23, 2023, 17 pages.

PCT/US2022/052885 , "International Search Report and Written Opinion", PCT Application No. PCT/US2022/052885, dated Apr. 21, 2023, 12 pages.

U.S. Appl. No. 17/557,815 , "Notice of Allowance", U.S. Appl. No. 17/557,815, dated Jul. 6, 2023, 5 pages.

* cited by examiner

GUIDED CACHE REPLACEMENT

BACKGROUND

A cache is a hardware or software component that stores data (at least temporarily) so that a future request for the data is served faster than it would be if the data were served from main memory. A "cache hit" occurs when requested data can be found in the cache, while a "cache miss" occurs when requested data cannot be found in the cache. A cache miss occurs, for example, in scenarios where the requested data has not yet been loaded into the cache or when the requested data was evicted from the cache prior to the request. A cache replacement policy defines rules for selecting one of the cachelines of the cache to evict so that the requested data can be loaded into the selected cacheline responsive to a cache miss.

BRIEF DESCRIPTION OF THE DRAWINGS

The detailed description is described with reference to the accompanying figures.

DETAILED DESCRIPTION

Overview

A cache replacement policy includes a set of rules to select a cacheline to evict responsive to a cache miss. For example, a cache replacement policy includes, or is otherwise implemented based on, a tree structure having leaf nodes that correspond to cachelines of the cache and a traversal algorithm for traversing the tree structure in order to select a leaf node corresponding to a cacheline to evict. In many cases, cachelines are designated as "non-replaceable" to protect its data from being evicted during a cache miss. Conventional approaches to maintain "non-replaceable" data are not guided, and thus the cache replacement policy is executed as normal. This results, however, in non-replaceable cachelines often being selected for eviction during the first traversal of the tree structure. To compensate for "non-replaceable" data being selected for eviction, conventional algorithms are often controlled to traverse back up and down the tree structure until a replaceable cacheline can be found. Doing additional traversals up and down the tree, however, takes multiple clock cycles and is difficult to implement in hardware.

Guided cache replacement is described herein to address certain aspects of the shortcomings in conventional cache replacement policies and implementations. In one or more implementations, guiding logic guides traversal of a tree structure according to a tree traversal algorithm (e.g., pseudo least recently used) by modifying decisions of the algorithm to avoid selection of a non-replaceable cacheline. The guiding logic causes an evaluation, at traversed nodes, of whether there are any leaf nodes that correspond to replaceable cachelines down the tree structure in the direction indicated by the traversal algorithm. In other words, the guiding logic causes the remaining leaf nodes that are available for selection (and replacement) to be identified if traversal continues in a direction indicated by the algorithm. If there is at least one leaf node corresponding to a replaceable cacheline in the indicated direction, then the guiding logic allows the traversal to continue to the node indicated by the traversal algorithm. If there are no leaf nodes corresponding to replaceable cachelines in the indicated direction, however, the guiding logic causes traversal of the tree structure to proceed to a node in a direction different from the direction indicated by the traversal algorithm.

In this way, the guiding logic overrides the traversal algorithm to avoid selection of a non-replaceable cacheline. Moreover, the guiding logic avoids selection of non-replaceable cachelines without having to traverse back up the tree structure. For example, rather than traversing down the tree structure to select a leaf node that is determined to correspond to a non-replaceable cacheline, and then traversing back up and then down the tree structure again until a leaf node corresponding to a replaceable cacheline is selected, the guiding logic overrides the algorithm at a node where following the direction indicated by the traversal algorithm causes traversal from that node to a next node having no leaf nodes corresponding to replaceable cachelines.

Due to such overrides, the guiding logic steers each traversal of the tree structure so that it is traversed from the root node to the leaf node one time, without traversing a node multiple times. Thus, the cache replacement policy selects a cacheline to evict, while avoiding non-replaceable cachelines, with reduced clock cycles compared to the clock cycles required by conventional approaches which traverse back up the tree structure when a non-replaceable cacheline is encountered in order to find a replaceable cacheline. Moreover, by eliminating back traversals, the guiding logic enables the cache replacement policy to be implemented in hardware that carries out the policy, whereas policies that rely on backtracking are more expensive to implement in hardware, if they can be implemented in hardware at all. Thus, in certain implementations improvements in time, speed and/or power consumption may be achieved.

In some aspects, the techniques described herein relate to a method including: receiving a request to access a cache; and guiding traversal of a tree structure having nodes corresponding to cachelines of the cache using a traversal algorithm to select a cacheline to allocate to the request, wherein guiding traversal modifies at least one decision of the traversal algorithm to avoid selection of a non-replaceable cacheline.

In some aspects, the techniques described herein relate to a method, wherein the request to access the cache corresponds to a cache miss.

In some aspects, the techniques described herein relate to a method, further including: evicting previous data stored in the selected cacheline; and loading data corresponding to the request into the selected cacheline.

In some aspects, the techniques described herein relate to a method, wherein guiding traversal further includes, during the guided traversal of the tree structure, modifying at least one decision of the traversal algorithm.

In some aspects, the techniques described herein relate to a method, wherein the tree structure includes a binary tree having leaf nodes corresponding to the cachelines of the cache.

In some aspects, the techniques described herein relate to a method, wherein guiding traversal further includes: evaluating, at traversed nodes of the tree structure, whether there is at least one leaf node corresponding to a replaceable cacheline down the tree structure in a direction indicated by the traversal algorithm; if there is at least one leaf node corresponding to a replaceable cacheline in the direction indicated by the traversal algorithm, causing traversal of the tree structure to proceed to a first node in the direction indicated by the traversal algorithm; or if there is not at least one leaf node corresponding to a replaceable cacheline in the direction indicated by the traversal algorithm, causing traversal of the tree structure to proceed to a second node in a direction different from the direction indicated by the traversal algorithm.

In some aspects, the techniques described herein relate to a method, wherein the guiding traversal selects the cacheline to allocate to the request without traversing back up the tree structure.

In some aspects, the techniques described herein relate to a method, further including accessing a cache replacement policy which controls loading data into the cache, the cache replacement policy including the tree structure having nodes corresponding to cachelines of the cache and the traversal algorithm.

In some aspects, the techniques described herein relate to a system including: a cache; guiding logic to guide decisions of a cache replacement policy to avoid selection of a non-replaceable cacheline; and a controller to select a cacheline of the cache to evict responsive to a cache miss based on the cache replacement policy and the guiding logic.

In some aspects, the techniques described herein relate to a system, wherein the cache replacement policy includes a tree structure having nodes corresponding to cachelines of the cache and a traversal algorithm controlling traversal of the tree structure to select one of the cachelines.

In some aspects, the techniques described herein relate to a system, wherein the controller is further configured to: evict previous data stored in the selected cacheline; and load data associated with cache miss into the selected cacheline.

In some aspects, the techniques described herein relate to a system, further including a data store and a cache client.

In some aspects, the techniques described herein relate to a system, wherein cache replacement policy includes the guiding logic.

In some aspects, the techniques described herein relate to a method including: modifying logic of a cache replacement policy to prevent selection of a non-replaceable cacheline of a cache; traversing a tree structure using the cache replacement policy with the modified logic to select a cacheline to evict responsive to a cache miss; and loading data associated with the cache miss into the selected cacheline.

In some aspects, the techniques described herein relate to a method, wherein the cache replacement policy includes a pseudo least recently used algorithm for traversing the tree structure.

In some aspects, the techniques described herein relate to a method, wherein the cache replacement policy includes an algorithm for traversing the tree structure other than pseudo least recently used.

In some aspects, the techniques described herein relate to a method, wherein the traversing the tree structure includes overriding at least one traversal direction of the pseudo least recently used algorithm to prevent selection of the non-replaceable cacheline of the cache.

In some aspects, the techniques described herein relate to a method, wherein the tree structure includes a binary tree.

In some aspects, the techniques described herein relate to a method, wherein the traversing selects the cacheline to evict during a single traversal of the tree structure from a root node to a leaf node corresponding to the selected cacheline.

In some aspects, the techniques described herein relate to a method, wherein the traversing selects the cacheline to evict without traversing back up the tree structure.

Figure 1:
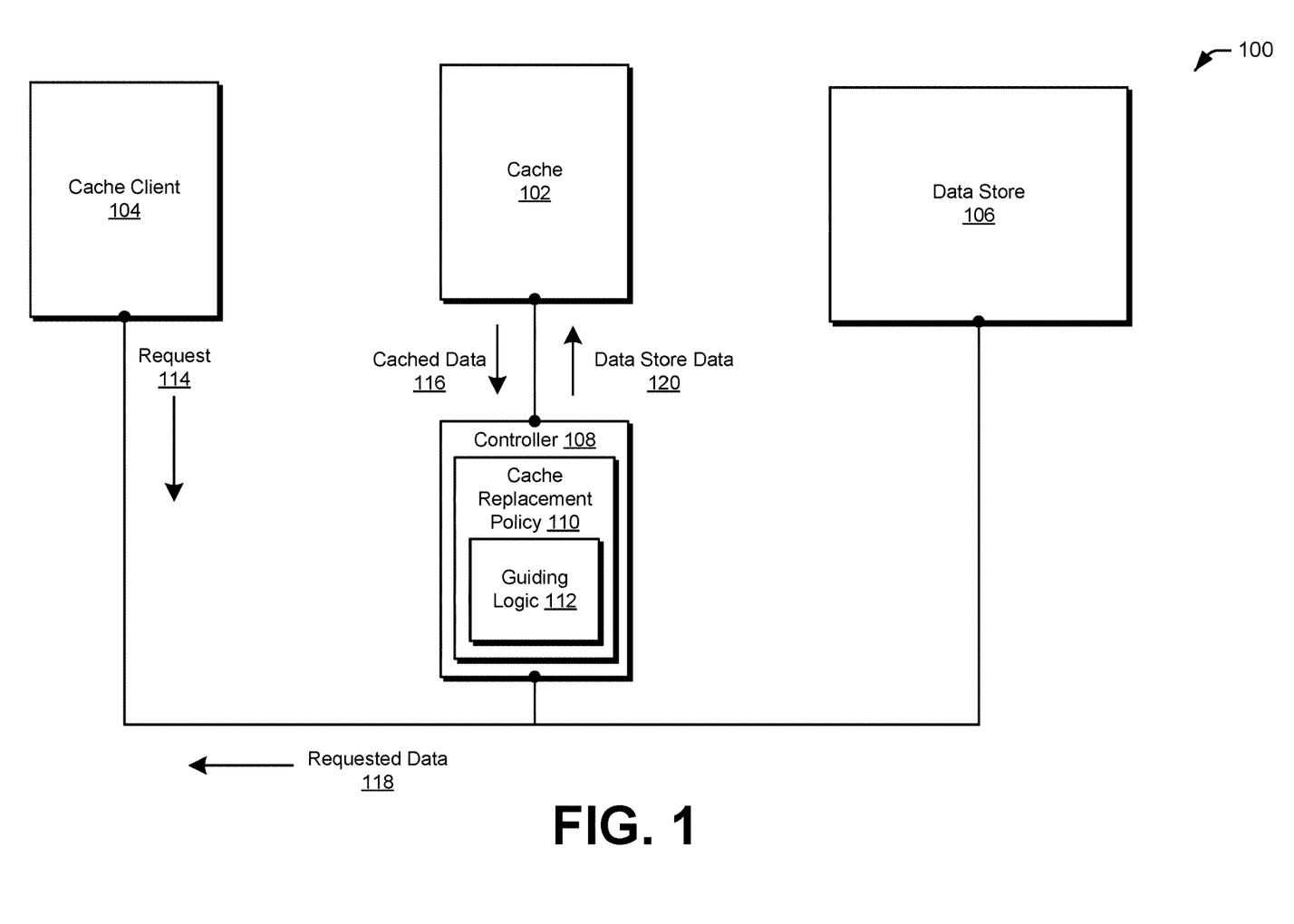
FIG. 1 is a block diagram of a non-limiting example system having a cache and a controller with a guided cache replacement policy according to some implementations.

FIG. 1 is a block diagram of a non-limiting example system 100 having a cache and a controller with a guided cache replacement policy according to some implementations. In particular, the system includes cache 102, cache client 104, data store 106, and controller 108, which includes cache replacement policy 110 that is guided by guiding logic 112. In accordance with the described techniques, the cache 102 the cache client 104, and the data store 106 are coupled to one another via a wired or wireless connection. Example wired connections include, but are not limited to, buses connecting two or more of the cache 102, the cache client 104, and the data store 106.

The cache 102 is a hardware or software component that stores data (e.g., at least temporarily) so that a future request for the data is served faster from the cache 102 than from the data store 106. In one or more implementations, the cache 102 is at least one of smaller than the data store 106, faster at serving data to the cache client 104 than the data store 106, or more efficient at serving data to the cache client 104 than the data store 106. Additionally or alternatively, the cache 102 is located closer to the cache client 104 than is the data store 106. It is to be appreciated that in various implementations the cache 102 has additional or different characteristics which make serving at least some data to the cache client 104 from the cache 102 advantageous over serving such data from the data store 106.

In one or more implementations, the cache 102 is a memory cache, such as a particular level of cache (e.g., L1 cache) where the particular level is included in a hierarchy of multiple cache levels (e.g., L0, L1, L2, L3, and L4). In some variations, the cache 102 is a hardware component built into and used by the cache client 104. In other examples, the cache 102 is implemented at least partially in software, such as in at least one scenario where the cache client 104 is a web browser or a web server. The cache 102 is also implementable in different ways without departing from the spirit or scope of the described techniques.

The cache client 104 is a component that requests access to data for performing one or more operations in relation to such data. Examples of the cache client 104 include, but are not limited to, a central processing unit, a parallel accelerated processor (e.g., a graphics processing unit), a digital signal processor, a hardware accelerator, an operating system, a web browser, a web server, and a lower-level cache (e.g., a lower-level in a cache hierarchy than the cache 102), to name just a few.

In various implementations, the cache client 104 provides a request 114 for access to data. By way of example, the request 114 is a request for write access to the data or a request for read access to the data. In accordance with the described techniques, the request 114 is received to access the cache to attempt to find the data in the cache 102. For example, the request 114 is received by the controller 108. Responsive to the request 114, for instance, the controller 108 searches the cache 102 to determine if the data is stored in the cache 102. If, by searching the cache 102, the controller 108 identifies that the data is stored in the cache 102, then the controller 108 provides access to the data in the cache 102. As described herein, a "cache hit" occurs when the controller 108 is able to identify that the data, identified by the request 114, is stored in the cache 102. When the request 114 is for write access on a cache hit, the controller 108 modifies (e.g., updates) the data in the cache 102 that is identified by the request 114. When the request 114 is for read access, on a cache hit, the controller 108 retrieves the data in the cache 102 that is identified by the request 114. In the illustrated example, data retrieved from the cache 102 based on the request 114 is depicted as cached data 116. The controller 108 provides the cached data 116 to the cache client 104.

The illustrated example also depicts requested data 118. The requested data 118 corresponds to the data provided to the cache client 104 responsive to the request 114. When the data identified in the request 114 is served from the cache 102, on a cache hit for example, the requested data 118 corresponds to the cached data 116. In one or more scenarios, though, the data identified in the request 114 is served from the data store 106. In a scenario where the data is not found in the cache 102 and is flagged as being stored in a non-cacheable location of the data store 106, for instance, the requested data 118 corresponds to data provided to the cache client 104 from the data store 106. As described herein, a "cache miss" occurs when the controller 108 does not identify the data, identified by the request 114, in the cache 102. A cache miss occurs, for example, when the data identified by the request 114 has not yet been loaded into the cache 102 or when the data identified by the request 114 was evicted from the cache 102 prior to the request 114.

In various scenarios, the controller 108 loads the data identified by the request from the data store 106 into the cache 102 responsive to a cache miss. In the illustrated example, data retrieved from the data store 106 and loaded into the cache 102 is depicted as data store data 120. When a cache miss is determined, for instance, the data requested by the request 114 is identified in the data store 106 and is loaded from the data store 106 into one or more "locations" in the cache 102, e.g., into one or more cachelines of the cache 102. This enables future requests for the data to be served from the cache 102 rather than from the data store 106. As discussed in more detail below, the controller 108 loads the data from the data store 106 (e.g., the data store data 120) into the cache 102 based on the cache replacement policy 110.

In accordance with the described techniques, the data store 106 is a computer-readable storage medium that stores data. Examples of the data store 106 include, but are not limited to, main memory (e.g., random access memory), a higher-level cache (e.g., L2 cache when the cache 102 is an L1 cache), secondary storage (e.g., a mass storage device), and removable media (e.g., flash drives, memory cards, compact discs, and digital video disc), to name just a few. Examples of the data store 106 also include virtual memory, which leverages underlying secondary storage of a computing device according to one or more memory management techniques. It is to be appreciated that the data store 106 is configurable in a variety of ways without departing from the spirit or scope of the described techniques.

As mentioned above, the controller 108 loads data into the cache 102 from the data store 106, e.g., responsive to a cache miss. In particular, the controller 108 loads the data according to the cache replacement policy 110. The cache replacement policy 110 controls which cachelines of the cache 102 have their previous data evicted and loaded with the data from the data store 106 that corresponds to the request 114. In one or more implementations, the cache replacement policy 110 is or includes a hardware-maintained structure that manages replacement of cachelines according to an underlying algorithm. Alternatively or in addition, the cache replacement policy 110 is or includes a computer program that manages replacement of the cachelines according to the underlying algorithm.

Example cache replacement polices include, but are not limited to, first in first out, last in first out, least recently used, time-aware least recently used, most recently used, pseudo least recently used, random replacement, segmented least recently used, least-frequently used, least frequently recently used, and least frequently used with dynamic aging, to name just a few. Example implementations, in which the cache replacement policy 110 is configured at least partially according to a pseudo least recently used algorithm, are discussed in more detail in relation to FIGS. 2-4.

In accordance with the described techniques, the guiding logic 112 guides decisions of an algorithm of the cache replacement policy 110 made in connection with selecting a cacheline for evicting and loading data. For example, the guiding logic 112 guides how a tree structure of the cache replacement policy 110 is traversed using a traversal algorithm of the cache replacement policy 110. In some variations, for instance, the guiding logic 112 specifies additional conditions to be evaluated in relation to the traversal algorithm and/or overrides traversal instructions of the algorithm based on such evaluations. In one or more implementations, the guiding logic 112 guides traversal of a tree structure using a traversal algorithm of the cache replacement policy 110 so that the controller 108 avoids selecting non-replaceable cachelines and instead selects a replaceable cacheline. In particular, the guiding logic 112 guides the traversal so that the tree structure is traversed without performing any back traversal of the tree structure.

The guiding logic 112 is implementable in various ways in accordance with the described techniques. For example, the guiding logic 112 is implemented in software, such as by injecting additional code into code which implements the traversal algorithm of the cache replacement policy 110. In at least one such example, the additional code causes additional conditions to be evaluated in relation to the traversal algorithm and/or causes traversal instructions of the algorithm to be overridden depending on those evaluations. Alternatively or additionally, the guiding logic 112 is implemented by one or more hardware components. For example, the guiding logic 112 is implemented by one or more hardware components that are integral with hardware that implements the cache replacement policy 110 according to an underlying tree structure and traversal algorithm. Although the cache replacement policy 110 is depicted including the guiding logic 112 in the illustrated example, in one or more implementations the guiding logic 112 is not included as part of the cache replacement policy 110 but is accessible by the cache replacement policy 110, such as while identifying a cacheline to select for evicting and loading data. The guiding logic 112 is implemented in different ways in one or more implementations without departing from the spirit or scope of the described techniques.

In one or more implementations, the cache replacement policy 110 corresponds to pseudo least recently used, and the guiding logic 112 provides additional logic which is evaluated in connection with decisions made according to the pseudo least recently used algorithm. In one or more scenarios, evaluations made, due to the addition of the guiding logic 112, cause traversal of the tree structure to be modified from pseudo least recently used. For a discussion of pseudo least recently used, consider the following discussion of FIG. 2.

Figure 2:
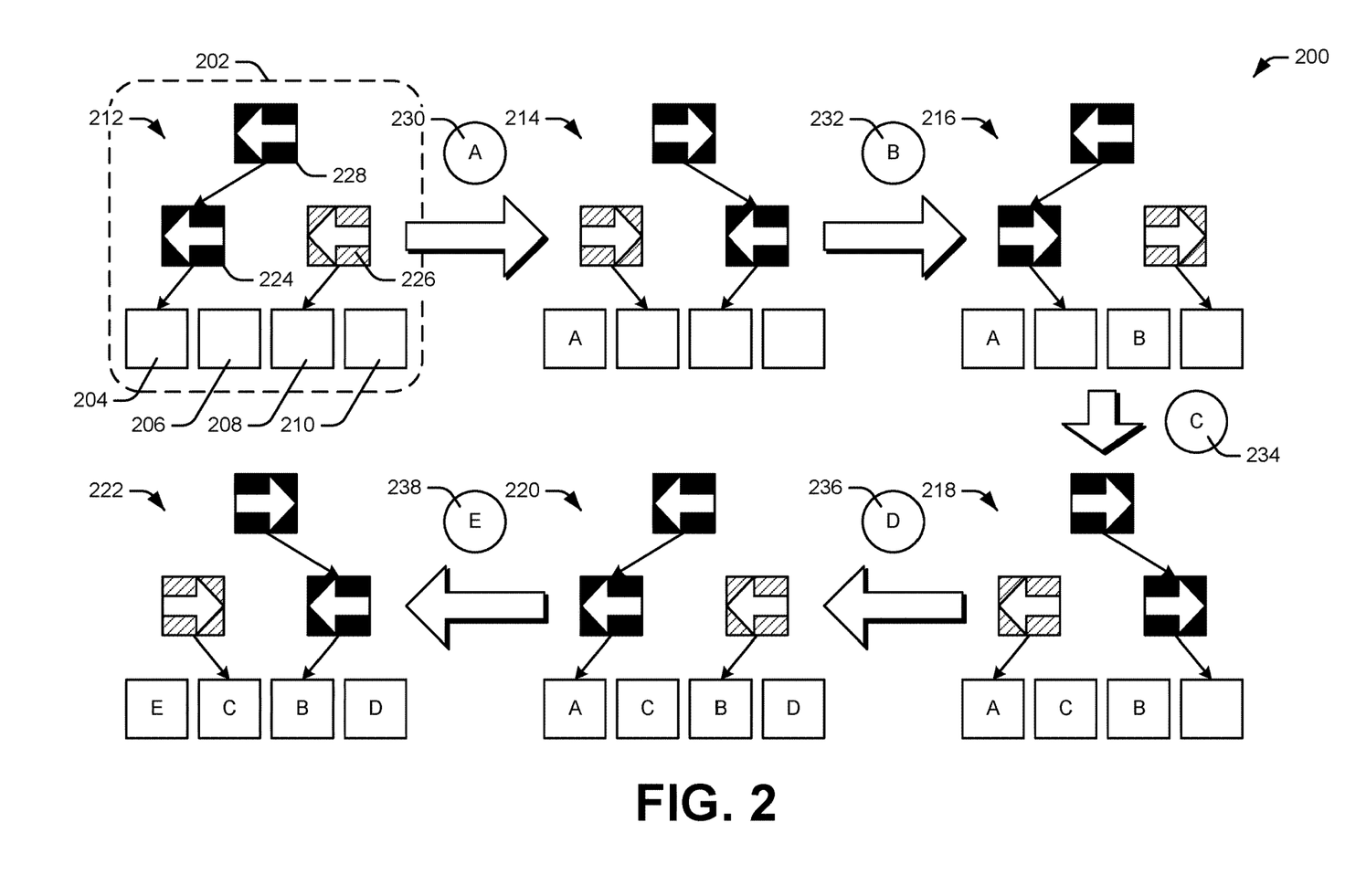
FIG. 2 depicts a non-limiting example in which a tree structure of a cache replacement policy is traversed according to a traversal algorithm of the cache replacement policy to select cachelines.

FIG. 2 depicts a non-limiting example 200 in which a tree structure of a cache replacement policy is traversed according to a traversal algorithm of the cache replacement policy to select cachelines.

The illustrated example 200 includes tree structure 202. In this example 200, the tree structure is a binary tree. In other examples, however, the cache replacement policy 110 is implemented using other tree structures or no tree structure. As illustrated, the tree structure 202 includes leaf nodes 204, 206, 208, 210. As described herein, the "leaf nodes" correspond to nodes in a binary tree which do not have any child nodes. Additionally, the leaf nodes 204, 206, 208, and 210 correspond to cachelines of the cache 102. In conventional approaches, where traversals based on the traversal algorithm of the cache replacement policy 110 are not guided to prevent selection of cachelines having non-replaceable nodes, the traversal algorithm simply causes the tree structure to be traversed according to a respective set of rules to select a cacheline for eviction and loading data. However, this results in traversals that involve processing nodes of the tree structure 202 which correspond to non-replaceable cachelines, in one or more scenarios.

In the illustrated example 200, the tree structure 202 is depicted being traversed according to the traversal algorithm at multiple stages and causing selection of a cacheline for eviction and loading at each stage. The depicted stages include first stage 212, second stage 214, third stage 216, fourth stage 218, fifth stage 220, and sixth stage 222. In particular, the multiple stages 212-222 depict traversal of the tree according to a pseudo least recently used algorithm, which is one example of a traversal algorithm for traversing a binary tree. As noted above, in various implementations the cache replacement policy 110 is configured based on different algorithms without departing from the spirit or scope of the described techniques.

In accordance with pseudo least recently used, each node of the tree structure 202 includes or is otherwise associated with a traversal direction indicator that indicates a direction of traversal down the tree structure from the node to a child node, e.g., the indicator indicates whether the traversal is to proceed from the node to a left child node or to a right child node. If during a traversal the node is traversed, the indicator of direction is switched to indicate the other direction for a subsequent traversal, e.g., if the indicator of a node indicates to proceed to the left child node prior to a traversal and the node is traversed during the traversal (e.g., by proceeding as directed by the indicator from the node to the left child node), then the indicator is switched to indicate to proceed from the node to the right child node the next time the node is traversed, and vice-versa.

In addition to the leaf nodes 204-210, the tree structure 202 in this example 200 also includes nodes 224, 226, 228. As the tree structure 202 is a binary tree, each node (other than the leaf nodes) has exactly two child nodes. In this example, node 224 and node 226 are "child" nodes of node 228, which is thus a "parent" of node 224 and node 226. Similarly, leaf nodes 204 and 206 are "child" nodes of node 224 (which is thus a "parent" of leaf nodes 204 and 206) and leaf nodes 208 and 210 are "child" nodes of node 226 (which is thus a parent of leaf nodes 208 and 210).

In this example 200, each of the nodes 224, 226, 228 is illustrated with a graphical representation of a respective traversal direction indicator. At the first stage 212, for instance, the graphical representations indicate that the traversal direction indicator of the node 228 directs the algorithm to the left if the node 228 is traversed, the traversal direction indicator of the node 224 directs the algorithm to the left if the node 224 is traversed, and the traversal direction indicator of the node 226 directs the algorithm to the left if the node 226 is traversed. As noted above, according to pseudo least recently used, if a node is traversed during a traversal, then the traversal direction indicator of the node is switched, e.g., from pointing to the left child node to the right or from pointing to the right child node to the left.

To traverse the tree structure 202 according to pseudo least recently used, the traversal algorithm of the cache replacement policy 110 causes traversal to begin at the root node, i.e., node 228. At the first stage 212, the traversal direction indicator of the node 228 directs the traversal algorithm to proceed from the node 228 to its left child node, i.e., node 224. The traversal algorithm thus traverses the node 224. The traversal direction indicator of the node 224 directs the traversal algorithm to proceed from the node 224 to its left child node, i.e., leaf node 204. Since the child node of the node 224 is a leaf node, the algorithm stops at the leaf node 204, and thus selects the cacheline corresponding to the leaf node 204 for having previous data evicted and new data loaded from the data store 106. In the illustrated example 200, data 230 (graphically represented as 'A') from the data store 106 is thus loaded into the cacheline which corresponds to the node 204. Responsive to the traversal to evict data and load the data 230, the traversal direction indicators of traversed nodes are switched. Since the nodes 224, 228 are traversed in order to evict data and load the data 230, the traversal indicators of those nodes are switched from directing the algorithm to the left to directing the algorithm to the right. Since the node 226 is not traversed at the first stage 212, the traversal indicator of the node 226 is not switched—it remains directing the algorithm to the left.

Thus, at the second stage 214, the graphical representations of the respective traversal direction indicators indicate that the traversal direction indicator of the node 228 directs the algorithm to the right if the node 228 is traversed, the traversal direction indicator of the node 224 directs the algorithm to the right if the node 224 is traversed, and the traversal direction indicator of the node 226 directs the algorithm to the left if the node 226 is traversed. At the second stage 214, the traversal algorithm of the cache replacement policy 110 causes traversal to begin at the root node of the tree structure 202, i.e., node 228. At the second stage 214, the traversal direction indicator of the node 228 directs the traversal algorithm to proceed from the node 228 to its right child node, i.e., node 226. The traversal algorithm thus traverses the node 226. The traversal direction indicator of the node 226 directs the traversal algorithm to proceed from the node 226 to its left child node, i.e., the leaf node 208.

Since the child node of the node 226 is a leaf node, the algorithm stops at the leaf node 208, and thus selects the cacheline corresponding to the leaf node 208 for having data evicted and new data loaded from the data store 106. In the illustrated example 200, data 232 (graphically represented as 'B') from the data store 106 is thus loaded into the cacheline which corresponds to the leaf node 208. Responsive to the traversal to evict data and load the data 232, the traversal direction indicators of traversed nodes are switched. Since the nodes 226, 228 are traversed in order to evict data and load the data 232, the traversal direction indicators of those nodes are switched. Specifically, the traversal direction indicator of the node 228 is switched from directing the algorithm to the right to directing the algorithm to the left, and the traversal direction indicator of the node 226 is switched from directing the algorithm to the left to directing the algorithm to the right. Since the node 224 is not traversed at the second stage 214, the traversal indicator of the node 224 is not switched—it remains directing the algorithm to the right.

Thus, at the third stage 216, the graphical representations indicate that the traversal direction indicator of the node 228 directs the algorithm to the left if the node 228 is traversed, the traversal direction indicator of the node 224 directs the algorithm to the right if the node 224 is traversed, and the traversal direction indicator of the node 226 directs the algorithm to the right if the node 226 is traversed. At the third stage 216, the traversal algorithm of the cache replacement policy 110 causes traversal to begin at the root node of the tree structure 202, i.e., node 228. At the third stage 216, the traversal direction indicator of the node 228 directs the traversal algorithm to proceed from the node 228 to its left child node, i.e., node 224. The traversal algorithm thus traverses the node 224. The traversal direction indicator of the node 224 directs the traversal algorithm to proceed from the node 224 to its right child node, i.e., the leaf node 206.

Since the child node of the node 224 is a leaf node, the algorithm stops at the leaf node 206, and thus selects the cacheline corresponding to the leaf node 206 for having data evicted and new data loaded from the data store 106. In the illustrated example 200, data 234 (graphically represented as 'C') from the data store 106 is thus loaded into the cacheline which corresponds to the node 206. Responsive to the traversal to evict data and load the data 234, the traversal direction indicators of traversed nodes are switched. Since the nodes 224, 228 are traversed in order to evict data and load the data 234, the traversal direction indicators of those nodes are switched. Specifically, the traversal direction indicator of the node 228 is switched from directing the algorithm to the left to directing the algorithm to the right, and the traversal direction indicator of the node 224 is switched from directing the algorithm to the right to directing the algorithm to the left. Since the node 226 is not traversed at the third stage 216, the traversal direction indicator of the node 226 is not switched—it remains directing the algorithm to the right.

The traversal algorithm of the cache replacement policy 110 continues causing the tree structure 202 of the cache replacement policy 110 to be traversed according to the traversal direction indicators and continues to cause the indicators of traversed nodes to be switched over the fourth, fifth, and sixth stages 218, 220, 222, respectively. In connection with such traversals, the cache replacement policy 110 further directs eviction of data and loading of data 236 (graphically represented as 'D') from the data store 106 and of data 238 (graphically represented as 'E') from the data store into the cachelines corresponding to the illustrated leaf nodes.

Figure 3:
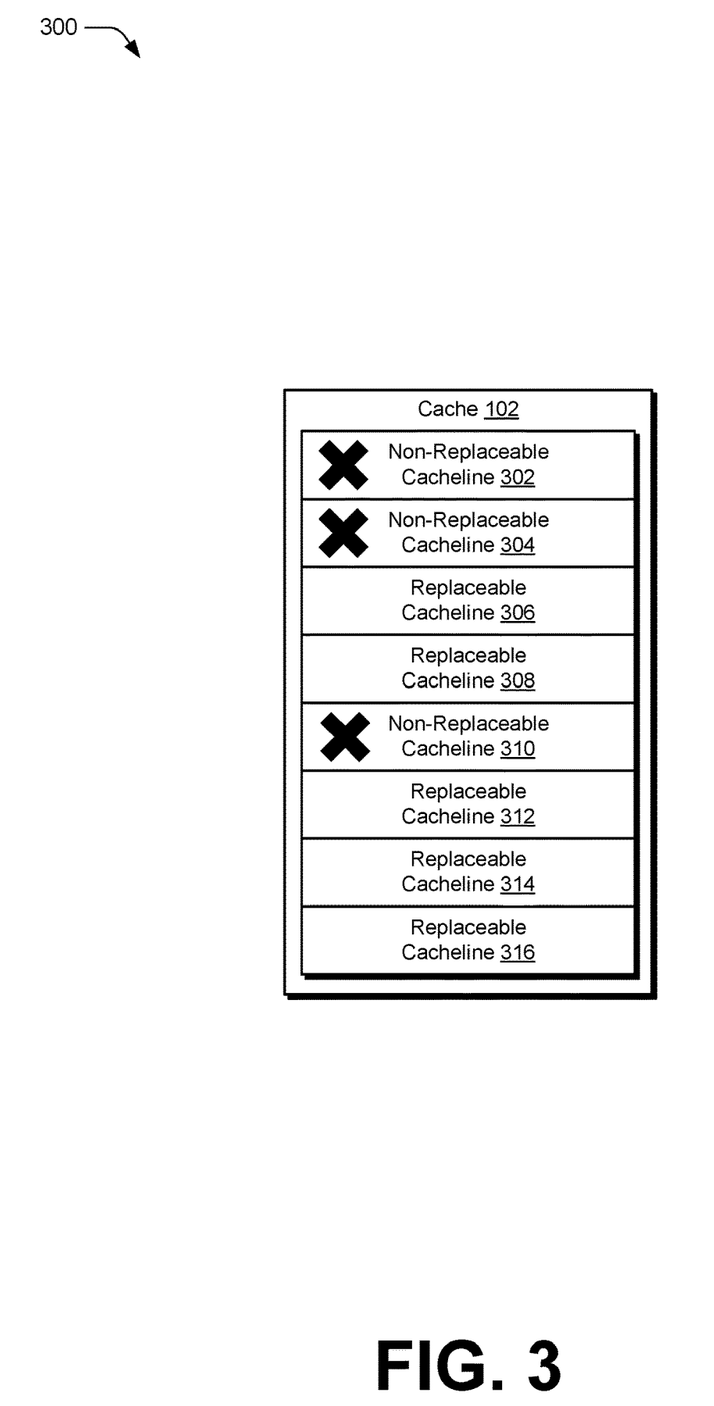
FIG. 3 depicts a non-limiting example of the cache in which cachelines of the cache are non-replaceable.
Figure 4:
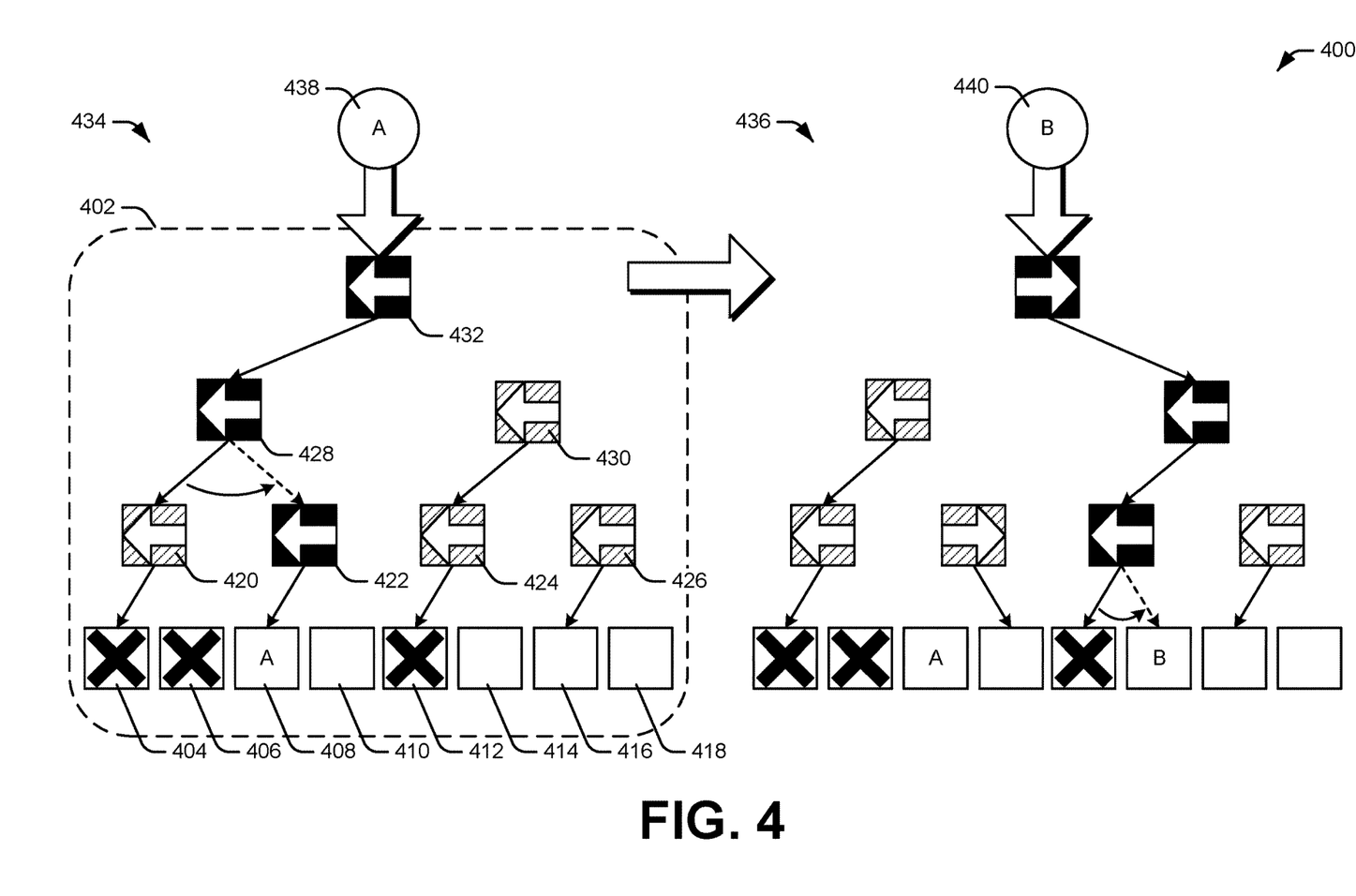
FIG. 4 depicts a non-limiting example of an implementation in which guiding logic guides traversal of a tree structure, in part, by modifying decisions of a traversal algorithm to avoid selecting non-replaceable cachelines.

In the context of guiding the cache replacement policy 110 to avoid selecting non-replaceable cachelines and instead selecting a replaceable cacheline, consider the following discussion of FIGS. 3 and 4.

FIG. 3 depicts a non-limiting example 300 of the cache in which cachelines of the cache are non-replaceable. The example 300 includes from FIG. 1 the cache 102. In this example 300, the cache 102 is depicted with a plurality of cachelines, which are capable of storing data for access based on requests provided by the cache client 104, e.g., the request 114.

In this example 300, the cache 102 includes eight cachelines, although the cache 102 includes more or fewer cachelines in various implementations. Some of the cachelines in the illustrated example 300 are depicted as non-replaceable cachelines and some are depicted as replaceable cachelines. In particular, the cache 102 is illustrated including non-replaceable cacheline 302, non-replaceable cacheline 304, replaceable cacheline 306, replaceable cacheline 308, non-replaceable cacheline 310, replaceable cacheline 312, replaceable cacheline 314, and replaceable cacheline 316.

As described herein, a "replaceable" cacheline is one that, if selected according to the cache replacement policy 110, is permitted to have data evicted from the cacheline and data from the data store 106 (e.g., data store data 120) loaded into the cacheline. In contrast, a "non-replaceable" cacheline is one that is protected from having its data evicted and data from the data store 106 (e.g., the data store data 120) loaded into the cacheline—the data in that cacheline is protected from eviction and the loading of data store data 120, even if the corresponding leaf node is traversed according to the traversal algorithm of the cache replacement policy 110.

In various implementations, cachelines are designated "non-replaceable" based on different factors. In one example, for instance, a cacheline is non-replaceable based on a determination that the data stored in the cacheline is used frequently by the cache client 104, such that leaving the data cached in the cache 102 is more efficient than permitting the data to be evicted. Alternatively or in addition, a cacheline is non-replaceable based on a flag of the data in the cacheline which indicates that the data is non-replaceable. Alternatively or in addition, a cacheline is non-replaceable based on its data supporting critical operations, such that if the data is not held in the cache 102 then processing by the cache client 104 stalls in a way that degrades performance of the system or causes crashes. It is to be appreciated that cachelines are designated as non-replaceable based on other factors without departing from the spirit or scope of the described techniques. As will be appreciated, the designation of "non-replaceable" of certain cachelines may be set dynamically.

FIG. 4 depicts a non-limiting example 400 of an implementation in which guiding logic guides traversal of a tree structure, in part, by modifying decisions of a traversal algorithm to avoid selecting non-replaceable cachelines. In the illustrated example, the guiding logic 112 guides traversal of tree structure 402 according to a tree traversal algorithm (e.g., pseudo least recently used) by modifying decisions of the algorithm to avoid selecting non-replaceable cachelines.

In this example 400, the tree structure 402 is a binary tree, although the cache replacement policy 110 is implemented using other tree structures in various implementations. As illustrated, the tree structure includes leaf nodes 404, 406, 408, 410, 412, 414, 416, and 418, as well as nodes 420, 422, 424, 426, 428, 430, and 432. In this example 400, the leaf nodes 404-418 correspond to the cachelines of the cache 102 from the example 300 depicted in FIG. 3. By way of example, the leaf node 404 corresponds to the non-replaceable cacheline 302, the leaf node 406 corresponds to the non-replaceable cacheline 304, the leaf node 408 corresponds to the replaceable cacheline 306, the leaf node 410 corresponds to the replaceable cacheline 308, the leaf node 412 corresponds to the non-replaceable cacheline 310, the leaf node 414 corresponds to the replaceable cacheline 312, the leaf node 416 corresponds to the replaceable cacheline 314, and the leaf node 418 corresponds to the replaceable cacheline 316. Thus, in this example, the guiding logic 112 guides traversal of the tree structure 402 by modifying decisions of the traversal algorithm to avoid selecting the leaf nodes 404, 406, or 412 that correspond to the non-replaceable cachelines 302, 304, and 310, respectively.

In this example 400, the guiding logic 112 modifies decisions of the pseudo least recently used algorithm during traversal of the tree structure 402. During traversal of the tree structure 402, the traversal algorithm indicates a direction of traverse at each node, e.g., to the left child node or to the right child node. The decision to traverse to the left or to the right affects which leaf nodes are ultimately selected as a result of a traversal.

To prevent selection of a leaf node corresponding to a non-replaceable cacheline, the guiding logic 112 causes an evaluation, at traversed nodes, of whether there are any leaf nodes that correspond to replaceable cachelines down the tree structure 402 in the direction indicated by the traversal algorithm. In other words, the guiding logic 112 causes the remaining leaf nodes that are available for selection (and replacement) to be identified if traversal continues in a direction indicated by the algorithm. If there is at least one leaf node corresponding to a replaceable cacheline in the indicated direction, then the guiding logic 112 allows the traversal to continue to the node indicated by the traversal algorithm. If there are no leaf nodes corresponding to replaceable cachelines in the indicated direction, however, the guiding logic 112 causes traversal of the tree structure 402 to proceed to a node in a direction different from the direction indicated by the traversal algorithm.

In this way, the guiding logic 112 can override the traversal algorithm (e.g., pseudo least recently used) to avoid selection of a non-replaceable cacheline. Moreover, the guiding logic 112 avoids selection of non-replaceable cachelines without traversing back up the tree structure 402. For example, rather than traversing down the tree structure 402 to select a leaf node that is determined to correspond to a non-replaceable cacheline, and then traversing back up and down the tree structure 402 until a leaf node corresponding to a replaceable cacheline is selected, the guiding logic 112 overrides the algorithm at a node where following the direction indicated by the traversal algorithm causes traversal from that node to a next node having no leaf nodes which correspond to replaceable cachelines. Due to such overrides, the guiding logic 112 steers each traversal of the tree structure 402 so that it is traversed a single time from the root node to the leaf node selected, without traversing a node multiple times. By eliminating back traversals, the guiding logic 112 enables the cache replacement policy 110 to be more readily implemented in hardware that carries out the policy, whereas policies that rely on backtracking are more expensive to implement in hardware, if they can be implemented in hardware at all.

To illustrate this, the example 400 includes two stages, including a first stage 434 and a second stage 436. At the first stage 434, data 438 (graphically represented as 'A') is received for loading into one of the cachelines of the cache 102. At the first stage 434, traversal of the tree structure 402 according to the traversal algorithm (e.g., pseudo least recently used) begins at the root node, i.e., node 432. At the node 432, the guiding logic 112 causes an evaluation of leaf nodes to be performed down the tree in the direction indicated by a traversal direction indicator. At the first stage 434, the traversal direction indicator of the node 432 indicates a traversal to the left child node of the node 432, i.e., node 428. In accordance with the described techniques, before traversing to the node 428, the guiding logic 112 causes the leaf nodes below the node 428 to be processed to determine if any of them correspond to replaceable cachelines. In this case, even though leaf nodes 404 and 406 correspond to non-replaceable cachelines, there are leaf nodes under the node 428 that correspond to replaceable cachelines, e.g., leaf nodes 408, 410. Because there is at least one leaf node under the node 428 that corresponds to a replaceable cacheline, the guiding logic 112 allows the traversal to proceed from the node 432 to the node 428 according to the traversal algorithm.

Accordingly, the node 428 is traversed. At the node 428, the guiding logic 112 causes an evaluation of leaf nodes to be performed down the tree in the direction indicated by the traversal direction indicator. At the first stage 434, the traversal direction indicator of the node 428 indicates a traversal to the left child node of the node 428, i.e., to node 420. In accordance with the described techniques, before traversing to the node 420, the guiding logic 112 causes the leaf nodes below the node 420 to be processed to determine if any of them correspond to replaceable cachelines. However, there are no leaf nodes under the node 420 that correspond to replaceable cachelines. Instead, the leaf nodes under the node 420, i.e., leaf nodes 404, 406, correspond to the non-replaceable cachelines 302, 304. Because there are no leaf nodes under the node 420 that correspond to replaceable cachelines, the guiding logic 112 prevents the traversal to proceed from the node 428 to the node 420 according to the traversal algorithm. Instead, the guiding logic 112 overrides the traversal algorithm to cause the traversal to proceed from the node 428 in a direction different from the direction indicated by the traversal algorithm. For example, the guiding logic 112 overrides the traversal algorithm to cause the traversal to proceed from the node 428 to the right child node, i.e., node 422, rather than proceed to the left child node as indicated by the algorithm.

Accordingly, the node 422 is traversed. At the node 422, the guiding logic 112 causes an evaluation to be performed down the tree in the direction indicated by the traversal direction indicator of the traversal algorithm. At the first stage 434, the traversal direction indicator of the node 422 indicates a traversal to the left child node of the node 422, i.e., leaf node 408. Since the child node of the node 422 is a leaf node and is replaceable, the guiding logic 112 allows the traversal to proceed from the node 422 to the leaf node 408 according to the traversal algorithm. Moreover, because the node traversed to is a leaf node, the traversal algorithm stops at the leaf node 408, and the cacheline corresponding to the leaf node 408 (e.g., replaceable cacheline 306) is thus selected for having data evicted and the data 438 loaded from the data store 106.

Because the nodes 432, 428, 422 were traversed in the traversal depicted at the first stage 434, the traversal algorithm causes the traversal direction indicators of those nodes to be switched. In particular, the traversal direction indicator of the node 432 is switched from pointing to the left child node (i.e., node 428) to pointing to the right child node (i.e., node 430) and the traversal direction indicator of the node 422 is switched from pointing to the left child node (i.e., leaf node 408) to pointing to the right child node (i.e., leaf node 410). Notably, the traversal direction indicator of the node 428 is not flipped in this case because the guiding logic 112 overrode the traversal algorithm by causing the traversal to proceed to the right child node (i.e., node 422) rather than the left child node. Thus, the traversal direction indicator of the node 428 remains pointing to the left child node (i.e., node 420). The updated traversal direction indicators are depicted in the second stage 436.

At the second stage 436, data 440 (graphically represented as 'B') is received for loading into one of the cachelines of the cache 102. At the second stage 436, traversal of the tree structure 402 according to the traversal algorithm (e.g., pseudo least recently used) begins at the root node, i.e., node 432. At the node 432, the guiding logic 112 causes an evaluation of leaf nodes to be performed down the tree in the direction indicated by a traversal direction indicator. In this example, the traversal direction indicator of the node 432 indicates a traversal to the right child node of the node 432, i.e., node 430. In accordance with the described techniques, before traversing to the node 430, the guiding logic 112 causes the leaf nodes below the node 430 to be processed to determine if any of them correspond to replaceable cachelines. However, there are leaf nodes under the node 430 that correspond to replaceable cachelines, e.g., leaf nodes 414, 416, 418. Because there are leaf nodes under the node 430 that correspond to replaceable cachelines, the guiding logic 112 allows the traversal to proceed from the node 432 to the node 430 according to the traversal algorithm.

Accordingly, the node 430 is traversed. At the node 430, the guiding logic 112 causes an evaluation of leaf nodes to be performed down the tree in the direction indicated by a traversal direction indicator. At the second stage 436, the traversal direction indicator of the node 430 indicates a traversal to the left child node of the node 430, i.e., node 424. In accordance with the described techniques, before traversing to the node 424, the guiding logic 112 causes the leaf nodes below the node 424 to be processed to determine if any of them correspond to replaceable cachelines. At the second stage 436, there is a leaf node under the node 424 that corresponds to a replaceable cacheline, e.g., leaf nodes 414. Because there is at least one leaf node under the node 424 that correspond to a replaceable cacheline, the guiding logic 112 allows the traversal to proceed from the node 430 to the node 424 according to the traversal algorithm. Notably, the traversal continues to node 424 even though there is a leaf node that corresponds to a non-replaceable cacheline, i.e., the leaf node 412 which corresponds to the non-replaceable cacheline 310.

Accordingly, the node 424 is traversed. At the node 424, the guiding logic 112 causes an evaluation to be performed down the tree in the direction indicated by the traversal direction indicator of the traversal algorithm. At the second stage 436, the traversal direction indicator of the node 424 indicates a traversal to the left child node of the node 424, i.e., leaf node 412. Since the child node of the node 424 is a leaf node and corresponds to a non-replaceable cacheline (e.g., the cacheline 310), the guiding logic 112 prevents the traversal to proceed from the node 424 to the leaf node 412 according to the traversal algorithm. Instead, the guiding logic 112 overrides the traversal algorithm to cause the traversal to proceed from the node 424 in a direction different from the direction indicated by the traversal algorithm. At the second stage 436, for example, the guiding logic 112 overrides the traversal algorithm to cause the traversal to proceed from the node 424 to the right child node, i.e., leaf node 414, rather than proceed to the left child node, i.e., leaf node 412, as indicated by the algorithm. Moreover, because the node traversed to is a leaf node, the traversal algorithm stops at the leaf node 414, and the cacheline corresponding to the leaf node 408 (e.g., replaceable cacheline 312) is thus selected for having data evicted and the data 440 loaded from the data store 106, as depicted at the second stage 436.

Because the nodes 432 and 430 were traversed in the traversal depicted at the second stage 436, the traversal algorithm causes the traversal direction indicators of those nodes to be switched. Notably, the traversal direction indicator of the node 424 is not flipped in this case because the guiding logic 112 overrode the traversal algorithm by causing the traversal to proceed to the right child node (i.e., leaf node 414) rather than the left child node. Thus, the traversal direction indicator of the node 424 remains pointing to the left child node (i.e., leaf node 412).

Figure 5:
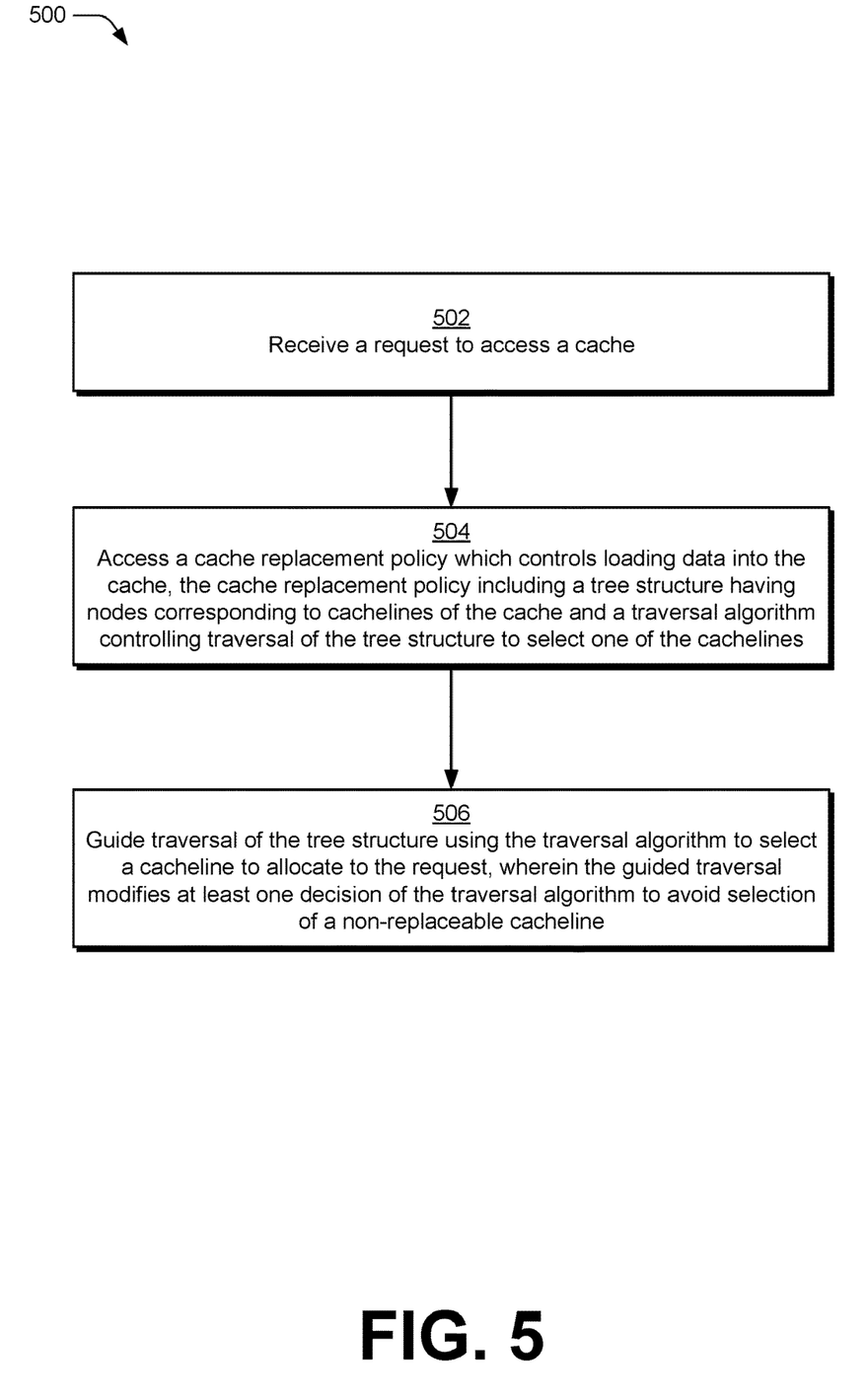
FIG. 5 depicts a procedure in an example implementation of guiding traversal of a tree structure to select a cacheline to allocate to a request.

FIG. 5 depicts a procedure 500 in an example implementation of guiding traversal of a tree structure to select a cacheline to allocate to a request.

A request to access a cache is received (block 502). By way of example, controller 108 receives a request 114 from the cache client 104 to access the cache 102. Responsive to the request 114, for instance, the controller 108 searches the cache 102 to determine if the data is stored in the cache 102. In one or more implementations, the request corresponds to a cache miss. For example, if the controller 108 identifies that data associated with the request 114 is stored in the cache 102, then the controller 108 provides access to the data in the cache 102. A cache hit occurs when the controller 108 is able to identify that the data, identified by the request 114, is stored in the cache 102. In contrast, a cache miss occurs when the controller 108 does not identify the data, identified by the request 114, in the cache 102. A cache miss occurs, for example, when the data identified by the request 114 has not yet been loaded into the cache 102 or when the data identified by the request 114 was evicted from the cache 102 prior to the request 114.

A cache replacement policy which controls loading data into the cache is accessed (block 504). In accordance with the principles discussed herein, the cache replacement policy includes a tree structure having nodes corresponding to cachelines of the cache and a traversal algorithm controlling traversal of the tree structure to select one of the cachelines. By way of example, cache replacement policy 110 is accessed responsive to a cache miss. The cache replacement policy 110 controls which cachelines of the cache 102 have their data evicted and loaded with the data from the data store 106 that corresponds to the request 114. The cache replacement policy 110 includes a tree structure, such as tree structure 402, and a traversal algorithm. In one or more implementations, the traversal algorithm corresponds to pseudo least recently used.

Traversal of the tree structure is guided using the traversal algorithm to select a cacheline to allocate to the request (block 506). In accordance with the principles discussed herein, the guided traversal modifies at least one decision of the traversal algorithm to avoid selection of a non-replaceable cacheline. By way of example, guiding logic 112 guides traversal of tree structure 402 according to a tree traversal algorithm (e.g., pseudo least recently used) by modifying decisions of the traversal algorithm to avoid selecting non-replaceable cachelines, e.g., to avoid selecting the leaf nodes 404, 406, or 412 that correspond to the non-replaceable cachelines 302, 304, and 310, respectively.

Figure 6:
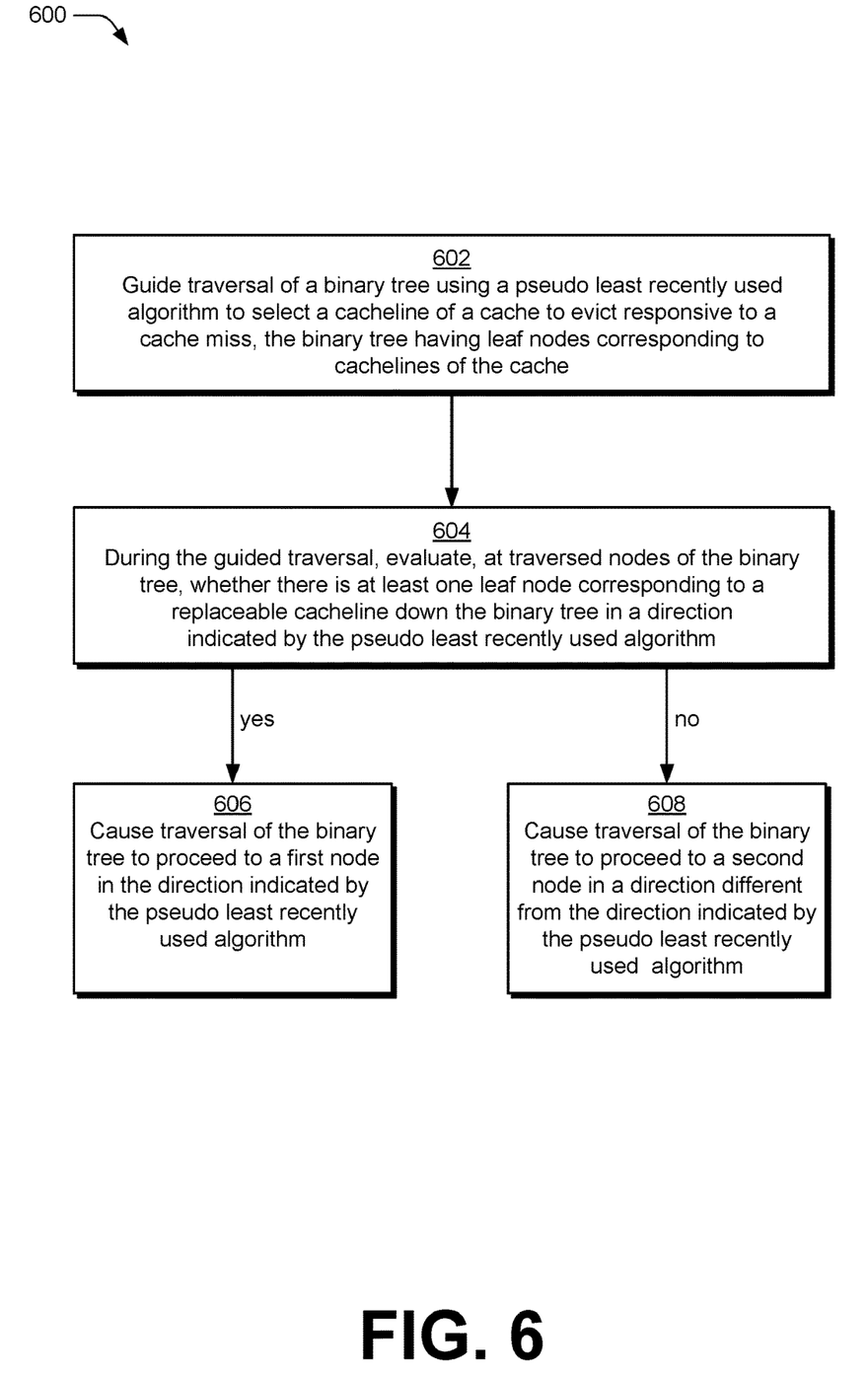
FIG. 6 depicts a procedure in an example implementation of guiding traversal of a binary tree using a pseudo least recently used algorithm to select a cacheline to evict.

FIG. 6 depicts a procedure 600 in an example implementation of guiding traversal of a binary tree using a pseudo least recently used algorithm to select a cacheline to evict.

Traversal of a binary tree is guided using a pseudo least recently used algorithm to select a cacheline to evict responsive to a cache miss (block 602). In accordance with the principles discussed herein, the binary tree has leaf nodes corresponding to cachelines of the cache. By way of example, the guiding logic 112 guides traversal of tree structure 402 according to a tree traversal algorithm (e.g., pseudo least recently used) by modifying decisions of the algorithm to avoid selecting non-replaceable cachelines. In one or more implementations, the tree structure 402 is a binary tree. In example 400, for instance, the tree structure is depicted as a binary tree and includes leaf nodes 404, 406, 408, 410, 412, 414, 416, and 418, as well as nodes 420, 422, 424, 426, 428, 430, and 432. The leaf nodes 404-418 correspond to the cachelines of the cache 102 from the example 300 depicted in FIG. 3.

During the guided traversal, at traversed nodes of the binary tree, it is evaluated whether there is at least one leaf node corresponding to a replaceable cacheline down the binary tree in a direction indicated by the pseudo least recently used algorithm (block 604). By way of example, during traversal of the tree structure 402, the traversal algorithm indicates a direction of traverse at each node, e.g., to the left child node or to the right child node. The decision to traverse to the left or to the right affects which leaf nodes are ultimately selected as a result of a traversal. Thus, in order to prevent selection of a leaf node corresponding to a non-replaceable cacheline, the guiding logic 112 causes an evaluation, at traversed nodes, of whether there are any leaf nodes that correspond to replaceable cachelines down the tree structure 402 in the direction indicated by the traversal algorithm. In other words, the guiding logic 112 causes the remaining leaf nodes that are available for selection (and replacement) to be identified if traversal continues in a direction indicated by the algorithm. If there is at least one leaf node corresponding to a replaceable cacheline in the indicated direction, then the guiding logic 112 allows the traversal to continue to the node indicated by the traversal algorithm. If there are no leaf nodes corresponding to replaceable cachelines in the indicated direction, however, the guiding logic 112 causes traversal of the tree structure 402 to proceed to a node in a direction different from the direction indicated by the traversal algorithm.

If there is at least one leaf node corresponding to a replaceable cacheline down the binary tree in the direction indicated by the pseudo least recently used algorithm ('yes"), then traversal of the binary tree is caused to proceed to a first node in the direction indicated by the pseudo least recently used algorithm (block 606). By way of example, at the first stage 434 of example 400, the traversal direction indicator of the node 432 indicates a traversal to the left child node of the node 432, i.e., node 428. In accordance with the described techniques, before traversing to the node 428, the guiding logic 112 causes the leaf nodes below the node 428 to be processed to determine if any of them correspond to replaceable cachelines. In this case, even though leaf nodes 404 and 406 correspond to non-replaceable cachelines, there are leaf nodes under the node 428 that correspond to replaceable cachelines, e.g., leaf nodes 408, 410. Because there is at least one leaf node under the node 428 that corresponds to a replaceable cacheline, the guiding logic 112 allows the traversal to proceed from the node 432 to the node 428 according to the traversal algorithm.

Alternately, if there is not at least one leaf node corresponding to a replaceable cacheline down the binary tree in the direction indicated by the pseudo least recently used algorithm ("no"), then traversal of the binary tree is caused to proceed to a second node in a direction different from the direction indicated by the pseudo least recently used algorithm (block 608). By way of example, at the first stage 434 of example 400, at the node 428 the guiding logic 112 causes an evaluation of leaf nodes to be performed down the tree in the direction indicated by the traversal direction indicator. In this case, the traversal direction indicator of the node 428 indicates a traversal to the left child node of the node 428, i.e., node 420. Before traversing to the node 420, the guiding logic 112 causes the leaf nodes below the node 420 to be processed to determine if any of them correspond to replaceable cachelines. However, there are no leaf nodes under the node 420 that correspond to replaceable cachelines. Instead, the leaf nodes under the node 420, i.e., leaf nodes 404, 406 correspond to the non-replaceable cachelines 302, 304. Because there are no leaf nodes under the node 420 that correspond to replaceable cachelines, the guiding logic 112 prevents the traversal to proceed from the node 428 to the node 420 according to the traversal algorithm. Instead, the guiding logic 112 overrides the traversal algorithm to cause the traversal to proceed from the node 428 in a direction different from the direction indicated by the traversal algorithm. For example, the guiding logic 112 overrides the traversal algorithm to cause the traversal to proceed from the node 428 to the right child node, i.e., node 422, rather than proceed to the left child node as indicated by the traversal algorithm.

It should be understood that many variations are possible based on the disclosure herein. Although features and elements are described above in particular combinations, each feature or element is usable alone without the other features and elements or in various combinations with or without other features and elements. For example, aspects of the guiding logic described herein could form part of the cache replacement policy. That is, the cache replacement policy includes the guiding logic described herein.

The various functional units illustrated in the figures and/or described herein (including, where appropriate, the cache 102, the cache client 104, the data store 106, the controller 108, the cache replacement policy 110, and the guiding logic 112) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
    a cache;
    guiding logic to guide decisions of a cache replacement policy to avoid selection of a non-replaceable cacheline of the cache, wherein the cache replacement policy includes a tree structure having nodes corresponding to cachelines of the cache and a traversal algorithm controlling traversal of the tree structure to select one of the cachelines; and
    a controller to select a cacheline of the cache to evict responsive to a cache miss based on the cache replacement policy and the guiding logic, wherein the guiding logic guides traversal of the tree structure to select one of the cachelines by evaluating, at traversed nodes of a tree structure, whether there are any leaf nodes that correspond to a replaceable cacheline down the tree structure in a direction indicated by the traversal algorithm.

2. The system of claim 1, wherein the controller is further configured to:
    evict previous data stored in the selected cacheline; and
    load data associated with cache miss into the selected cacheline.

3. The system of claim 1, further comprising a data store and a cache client.

4. The system of claim 1, wherein cache replacement policy includes the guiding logic.

5. The system of claim 1, wherein the guiding logic is further configured to cause traversal of the tree structure to proceed in the direction indicated by the traversal algorithm if there is at least one leaf node corresponding to a replaceable cacheline in the direction indicated by the traversal algorithm.

6. The system of claim 1, wherein the guiding logic is further configured to cause traversal of the tree structure to proceed in a different direction from the direction indicated by the traversal algorithm if there is not at least one leaf node corresponding to a replaceable cacheline in the direction indicated by the traversal algorithm.

7. A method comprising:
    modifying a cache replacement policy to prevent selection of a non-replaceable cacheline of a cache;
    traversing a tree structure using the modified cache replacement policy to select a cacheline to evict responsive to a cache miss, wherein the cache replacement policy includes a traversal algorithm for traversing the tree structure, and wherein the traversing the tree structure comprises overriding at least one traversal direction of the traversal algorithm to prevent selection of a non-replaceable cacheline of the cache; and
    loading data associated with the cache miss into the selected cacheline.

8. The method of claim 7, wherein the traversal algorithm of the cache replacement policy comprises a pseudo least recently used algorithm for traversing the tree structure.

9. The method of claim 7, wherein the traversal algorithm of the cache replacement policy comprises an algorithm for traversing the tree structure other than pseudo least recently used.

10. The method of claim 7, wherein the tree structure comprises a binary tree.

11. The method of claim 7, wherein the traversing selects the cacheline to evict during a single traversal of the tree structure from a root node to a leaf node corresponding to the selected cacheline.

12. The method of claim 7, wherein the traversing selects the cacheline to evict without traversing back up the tree structure.

13. The method of claim 7, wherein overriding at least one traversal direction of the traversal algorithm to prevent selection of a non-replaceable cacheline of the cache further comprises causing traversal of the tree structure to proceed in a different direction from a direction indicated by the traversal algorithm if there is not at least one leaf node corresponding to a replaceable cacheline in the direction indicated by the traversal algorithm.

14. A method comprising:
    receiving a request to access a cache; and
    guiding traversal of a tree structure having nodes corresponding to cachelines of the cache using a traversal algorithm to select a cacheline to allocate to the request, wherein guiding traversal comprises evaluating, at traversed nodes of the tree structure during the traversal, whether there is at least one leaf node corresponding to a replaceable cacheline down the tree structure in a direction indicated by the traversal algorithm and modifying at least one decision of the traversal algorithm by traversing the tree structure in a different direction from the direction indicated by the traversal algorithm if there is not at least one leaf node corresponding to the replaceable cacheline in the direction indicated by the traversal algorithm to avoid selection of a non-replaceable cacheline.

15. The method of claim 14, wherein the request to access the cache corresponds to a cache miss.

16. The method of claim 15, further comprising:
    evicting previous data stored in the selected cacheline; and
    loading data corresponding to the request into the selected cacheline.

17. The method of claim 14, wherein the tree structure comprises a binary tree having leaf nodes corresponding to the cachelines of the cache.

18. The method of claim 14, wherein guiding traversal further comprises
    causing traversal of the tree structure to proceed in the direction indicated by the traversal algorithm if there is at least one leaf node corresponding to the replaceable cacheline in the direction indicated by the traversal algorithm.

19. The method of claim 14, wherein the guiding traversal selects the cacheline to allocate to the request without traversing back up the tree structure.

20. The method of claim 14, further comprising accessing a cache replacement policy which controls loading data into the cache, the cache replacement policy including the tree structure having nodes corresponding to cachelines of the cache and the traversal algorithm.

* * * * *